(12) United States Patent
Pasad et al.

(10) Patent No.: US 9,730,244 B2
(45) Date of Patent: *Aug. 8, 2017

(54) METHOD AND APPARATUS FOR HANDLING RANDOM ACCESS CHANNEL RESPONSES

(71) Applicant: INTERDIGITAL PATENT HOLDINGS, INC., Wilmington, DE (US)

(72) Inventors: Kalpendu R. Pasad, Cupertino, CA (US); Shankar Somasundaram, Sunnyvale, CA (US); Jin Wang, Princeton, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/966,275

(22) Filed: Dec. 11, 2015

(65) Prior Publication Data

US 2016/0113033 A1    Apr. 21, 2016

Related U.S. Application Data

(63) Continuation of application No. 14/076,832, filed on Nov. 11, 2013, now Pat. No. 9,276,712, which is a
(Continued)

(51) Int. Cl.
*H04W 74/00* (2009.01)
*H04W 72/04* (2009.01)
(Continued)

(52) U.S. Cl.
CPC .......... *H04W 74/006* (2013.01); *H04L 5/003* (2013.01); *H04W 72/0466* (2013.01); *H04W 74/004* (2013.01); *H04W 74/0833* (2013.01)

(58) Field of Classification Search
None
See application file for complete search history.

(56) References Cited

U.S. PATENT DOCUMENTS

| 8,582,510 | B2 | 11/2013 | Pasad et al. | |
| 8,681,906 | B2 * | 3/2014 | Malladi | H04L 1/0038 |
| | | | | 375/340 |

(Continued)

FOREIGN PATENT DOCUMENTS

| CN | 101300886 | 11/2008 |
| JP | 2010-502120 A | 1/2010 |

(Continued)

OTHER PUBLICATIONS

3rd Generation Partnership Project (3GPP), R1-073648, "Signaling PCH, RACH response 33 and dynamic BCH in L1/L2 control channel", Nokia, Nokis Siemens Networks, 3GPP TSG RAN WG1, Meeting # 50, Athens, Greece, Aug. 20-24, 2007, 3 pages.*

(Continued)

*Primary Examiner* — Steve Young
(74) *Attorney, Agent, or Firm* — Youngae Kim (57) ABSTRACT

A method and apparatus for supporting a random access using a random access channel (RACH) are disclosed. The WTRU detects a format of control information in at least one control channel element (CCE) of a common area in a control portion of a downlink transmission. The control information indicates a resource allocation in a data portion of the downlink transmission. The WTRU recovers a random access response assigned to the WTRU from the indicated resource allocation of the data portion on a condition that the at least one CCE has a random access radio network terminal identifier (RA-RNTI) assigned to the WTRU.

20 Claims, 3 Drawing Sheets

Related U.S. Application Data continuation of application No. 12/260,495, filed on Oct. 29, 2008, now Pat. No. 8,582,510.

(60) Provisional application No. 60/983,473, filed on Oct. 29, 2007.

(51) Int. Cl.
*H04L 5/00* (2006.01)
*H04W 74/08* (2009.01)

(56) References Cited

U.S. PATENT DOCUMENTS

| | | | |
|---|---|---|---|
| 9,131,464 B2* | 9/2015 | Montojo | H04W 68/02 |
| 2004/0001429 A1 | 1/2004 | Ma et al. | |
| 2005/0026597 A1 | 2/2005 | Kim et al. | |
| 2007/0064669 A1* | 3/2007 | Classon | H04L 1/1822 |
| | | | 370/347 |
| 2007/0189205 A1 | 8/2007 | Terry et al. | |
| 2008/0084853 A1* | 4/2008 | Kuchibhotla | H04W 72/1273 |
| | | | 370/338 |
| 2008/0200203 A1* | 8/2008 | Malladi | H04W 52/287 |
| | | | 455/522 |
| 2008/0273610 A1 | 11/2008 | Malladi et al. | |
| 2009/0088148 A1* | 4/2009 | Chung | H04L 1/0029 |
| | | | 455/423 |
| 2009/0116424 A1 | 5/2009 | Abeta et al. | |
| 2011/0038275 A1 | 2/2011 | Kim et al. | |

FOREIGN PATENT DOCUMENTS

| | | |
|---|---|---|
| WO | WO-2007/052746 | 5/2007 |
| WO | WO-2007/091821 | 8/2007 |
| WO | WO 2007/091831 A2 | 8/2007 |
| WO | WO 2008/024788 A2 | 2/2008 |
| WO | WO 2008/042967 A2 | 4/2008 |
| WO | WO 2009/041779 A1 | 4/2009 |

OTHER PUBLICATIONS

3rd Generation Partnership Project (3GPP), R1-074360, "UE and CCE specific scrambling 34 codes for low complexity blind detection of downlink control signaling", Mitsubishi Electric, 3GPP TSG RAN WG1, Meeting # 50 bis, Shanghai, China, Oct. 8-17, 2007, 9 pages.*
3rd Generation Partnership Project (3GPP), R1-073376, "E-UTRA DL L1/L2 Control Channel Design—PICH/AICH/D-BCH", Motorola, 3GPP TSG RAN1 #50, Athens, Greece, Aug. 20-24, 2007, 6 pages.
3rd Generation Partnership Project (3GPP), R1-073441, "UE and CCE Specific Scrambling Codes for Low Complexity Blind Detection of Downlink Control Signaling", Mitsubishi Electric, 3GPP TSG RAN WG1 #50 meeting, Athens, Greece, Aug. 20-24, 2007, pp. 1-9.
3rd Generation Partnership Project (3GPP), R1-074078, "Configuration of PDCCH Monitoring Set", Samsung, 3GPP TSG RAN WG1 Meeting #50bis, Shanghai, China, Oct. 8-12, 2007, pp. 1-3.
3rd Generation Partnership Project (3GPP), R1-074218, "CCE Allocation Scheme in PDCCH for Efficient Blind Detection", ZTE, 3GPP TSG-RAN WG1 #50bis, Shanghai, China, Oct. 8-12, 2007, pp. 1-3.
3rd Generation Partnership Project (3GPP), R1-074319, "Signaling PCH, RACH Response and Dynamic BCH in DL-CCH", Nokia, Nokia Siemens Networks, 3GPP TSG RAN WG1 #50bis Meeting, Shanghai, China, Oct. 8-12, 2007, 3 pages.
3rd Generation Partnership Project (3GPP), R1-082110, "Format 1C Blind Decoding Restrictions", Motorola, Samsung, 3GPP TSG RAN1#53, Kansas City, MO, USA, May 5-9, 2008, 2 pages.
3rd Generation Partnership Project (3GPP), R2-072409, "Stage 3 Topics of Random Access Procedure", Nokia, Nokia Siemens Networks, 3GPP TSG•RAN WG2 Meeting #58bis, Orlando, U.S. A., Jun. 25-29, 2007, 4 pages.
3rd Generation Partnership Project (3GPP), R2-072901, "Performances of Realistic DL CQI Estimation Using Cell-Specific Frequency-Hopped/ Shifted DL RS", Huawei, TSG RAN WG1 meeting #49bis, Orlando, USA, Jun. 25-29, 2007, 5 pages.
3rd Generation Partnership Project (3GPP), R2-073315, "Message 2 Transmission When a Dedicated Preamble Used", Samsung, 3GPP TSG-RAN WG2#59, Athens, Greece, Aug. 20-24, 2007, pp. 1-2.
3rd Generation Partnership Project (3GPP), Tdoc R1-074317, "Reducing the Decoding Complexity of the PDCCH", Nokia, Nokia Siemens Networks, 3GPP TSG-RAN Working Group 1 #50bis, Shanghai, China, Oct. 8-12, 2007, 7 pages.
3rd Generation Partnership Project (3GPP), TR 25.814 V7.1.0, "Technical Specification Group Radio Access Network, Physical Layer Aspects for Evolved Universal Terrestrial Radio Access (UTRA) (Release 7)", Sep. 2006, 132 pages.
3rd Generation Partnership Project (3GPP), TR 25.912 V7.2.0, "Technical Specification Group Radio Access Network, Feasibility Study for Evolved Universal Terrestrial Radio Access (UTRA) and Universal Terrestrial Radio Access Network (UTRAN) (Release 7)", Jun. 2007, pp. 1-65.
3rd Generation Partnership Project (3GPP), TR 25.913 V7.3.0, "Technical Specification Group Radio Access Network, Requirements for Evolved UTRA (E-UTRA) and Evolved UTRAN (E-UTRAN) (Release 7)", Mar. 2006, pp. 1-18.
3rd Generation Partnership Project (3GPP), TS 36.211 V8.0.0, "Technical Specification Group Radio Access Network, Evolved Universal Terrestrial Radio Access (E-UTRA), Physical Channels and Modulation (Release 8)", Sep. 2007, pp. 1-50.
3rd Generation Partnership Project (3GPP), TS 36.211 V8.4.0, "Technical Specification Group Radio Access Network, Evolved Universal Terrestrial Radio Access (E-UTRA), Physical Channels and Modulation (Release 8)", Sep. 2008, pp. 1-78.
3rd Generation Partnership Project (3GPP), TS 36.212 V8.0.0, "Technical Specification Group Radio Access Network, Evolved Universal Terrestrial Radio Access (E-UTRA), Multiplexing and Channel Coding (Release 8)", Sep. 2007, pp. 1-30.
3rd Generation Partnership Project (3GPP), TS 36.212 V8.4.0, "Technical Specification Group Radio Access Network, Evolved Universal Terrestrial Radio Access (E-UTRA), Multiplexing and Channel Coding (Release 8)", Sep. 2008, pp. 1-56.
3rd Generation Partnership Project (3GPP), TS 36.213 V8.0.0, "Technical Specification Group Radio Access Network, Evolved Universal Terrestrial Radio Access (E-UTRA), Physical Layer Procedures (Release 8)", Sep. 2007, pp. 1-13.
3rd Generation Partnership Project (3GPP), TS 36.213 V8.3.0, "Technical Specification Group Radio Access Network, Evolved Universal Terrestrial Radio Access (E-UTRA), Physical Layer Procedures (Release 8)", May 2008, pp. 1-45.
3rd Generation Partnership Project (3GPP), TS 36.213 V8.4.0, "Technical Specification Group Radio Access Network, Evolved Universal Terrestrial Radio Access (E-UTRA), Physical Layer Procedures (Release 8)", Sep. 2008, pp. 1-60.
3rd Generation Partnership Project (3GPP), TS 36.300 V8.2.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Sep. 2007, pp. 1-109.
3rd Generation Partnership Project (3GPP), TS 36.300 V8.6.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Sep. 2008, pp. 1-137.
3rd Generation Partnership Project (3GPP), TS 36.321 V1.0.0, "Technical Specification Group Radio Access Network, Evolved Universal Terrestrial Radio Access (E-UTRA) Medium Access Control (MAC) Protocol Specification (Release 8)", Sep. 2007, pp. 1-18.
3rd Generation Partnership Project (3GPP), TS 36.321 V8.3.0, "Technical Specification Group Radio Access Network, Evolved (56) References Cited

OTHER PUBLICATIONS

Universal Terrestrial Radio Access (E-UTRA) Medium Access Control (MAC) Protocol Specification (Release 8)", Sep. 2008, pp. 1-36.
"Chinese Office Action", Chinese Application No. 201310718401.6, Jul. 5, 2016, 19 pages.
"Chinese Office Action", Chinese Application No. 201310717604.3, Jul. 4, 2016, 5 pages.
"Chinese Office Action (English Translation)", Chinese Application No. 201310718401.6, Jul. 5, 2016, 12 pages.
"Chinese Office Action (English Translation)", Chinese Application No. 201310717604.3, Jul. 4, 2016, 7 pages.
"Official Japanese Notice of Rejection", Japanese Patent Application No. 2015-238933, Oct. 4, 2016, 3 pages.
"Official Notice of Rejection (English Translation)", Japanese Patent Application No. 2015-238933, Oct. 4, 2016, 3 pages.

* cited by examiner

METHOD AND APPARATUS FOR HANDLING RANDOM ACCESS CHANNEL RESPONSES

CROSS REFERENCE TO RELATED APPLICATIONS

This application is a continuation of U.S. patent application Ser. No. 14/076,832 filed on Nov. 11, 2003, now issued, as U.S. Pat. No. 9,276,712 on Mar. 1, 2016, which is a continuation of U.S. patent application Ser. No. 12/260,495 filed on Oct. 29, 2008, now issued as U.S. Pat. No. 8,582,510 on Nov. 12, 2013, which claims the benefit of U.S. Provisional Patent Application Ser. No. 60/983,473 filed on Oct. 29, 2007, the entire contents of which are hereby incorporated by reference as if fully set forth.

FIELD OF INVENTION

The present application is related to wireless communications.

BACKGROUND

The objective of evolved universal terrestrial radio access (E-UTRA) and long term evolution (LTE) in wireless communications is to develop a radio access network towards a high-data-rate, low-latency, packet-optimized system with improved system capacity and coverage. In order to achieve these goals, an evolution of the radio interface as well as the radio network architecture is being considered. For example, orthogonal frequency division multiple access (OFDMA) and frequency division multiple access (FDMA) are proposed air interface technologies to be used in the downlink and uplink transmissions, respectively, instead of using code division multiple access (CDMA), which is currently used in 3rd Generation Partnership Project (3GPP) communication systems. Another change includes applying all packet switched service, which means all the voice calls will be made on the packet switched basis.

Packet switched communications operate on a random access channel. The physical channel specification for LTE specifies that the random access burst occupies a bandwidth corresponding to 72 sub-carriers (6 resource blocks). The set of six resource blocks is referred to as one time-frequency random access resource, or alternatively, resources of one LTE physical random access channel (PRACH). For the system flexibility, having a configurable number of time-frequency random access resources in one radio frame (10 ms) depends on the system bandwidth and the random access load. The existence of any additionally configured time-frequency random access resources needs to be explicitly signaled to wireless transmit/receive units (WTRUs).

There may be multiple random access preambles that are available for the access in one time-frequency random access resource, and the number of random accesses that expect the responses in a certain time window may vary greatly. If an evolved Node-B (eNB) always needs to signal all responses in one transport block per one random access-radio network temporary identity (RA-RNTI), the resultant size of the transport block may reduce the scheduling flexibility of the random access response.

SUMMARY

A method and apparatus for supporting a random access using a random access channel (RACH) are disclosed. Each of a plurality of wireless transmit/receive units (WTRUs) sends a random access request to a base station on an uplink RACH preamble. A RACH Response, sent by the base station, is received by each WTRU. A control signal portion of the RACH Response indicates the location of the RACH Response message in a corresponding data portion. The RACH Response control information is defined by single or multiple control channel elements (CCE), where each WTRU is allocated at least one CCE to provide its unique RACH Response control signal. The WTRU is configured to locate its intended CCE from among the multiple CCEs sent by the base station.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Herein, the term "RACH Response" is used interchangeably with an access indication channel (AICH) message.

Figure 1:
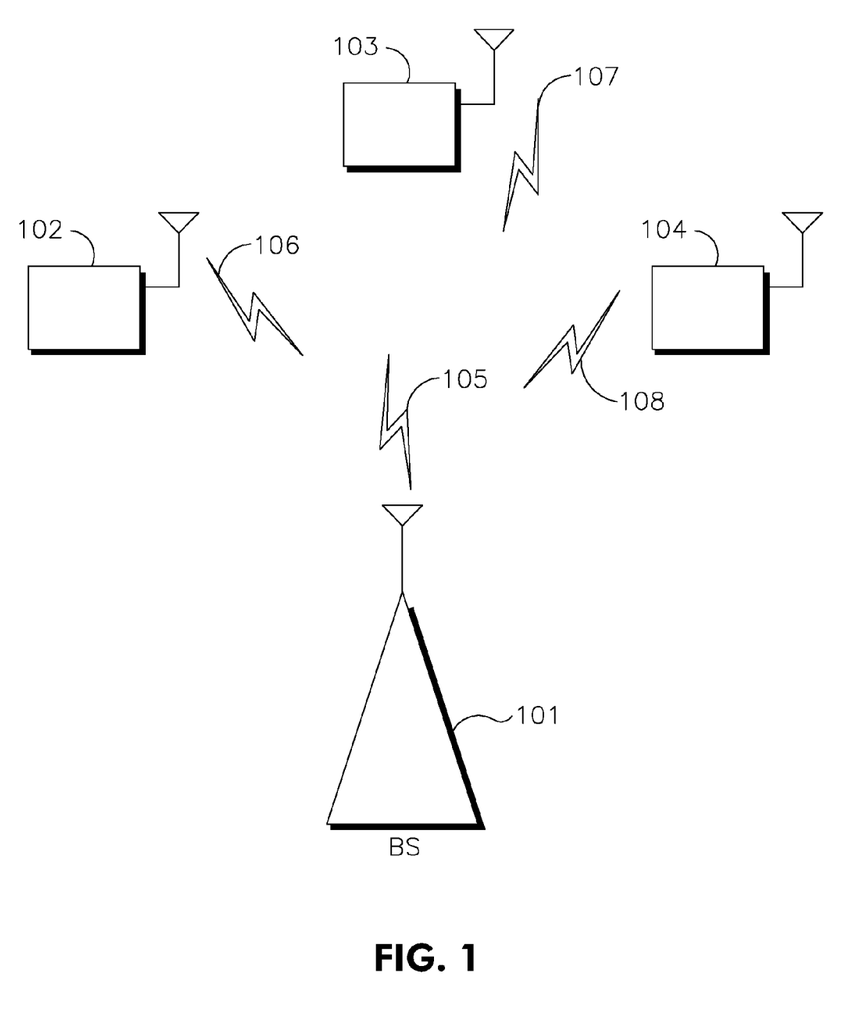
FIG. 1 shows a wireless communication network using random access.

FIG. 1 shows a wireless communication network 100, in which a base station 101 grants random access to a plurality of wireless transmit/receive units (WTRUs) 102-104. A RACH Response signal 105 is sent to the WTRUs 102-104 granting random access resource allocations in response to random access requests 106-108 sent by the WTRUs 102-104. The random access requests 106-108 are sent in RACH preambles from the same random access burst. A single time-frequency random access resource is granted per random access request by one of the WTRUs 102-104. Alternatively, multiple time-frequency random access resources may be granted per random access request.

Figure 2:
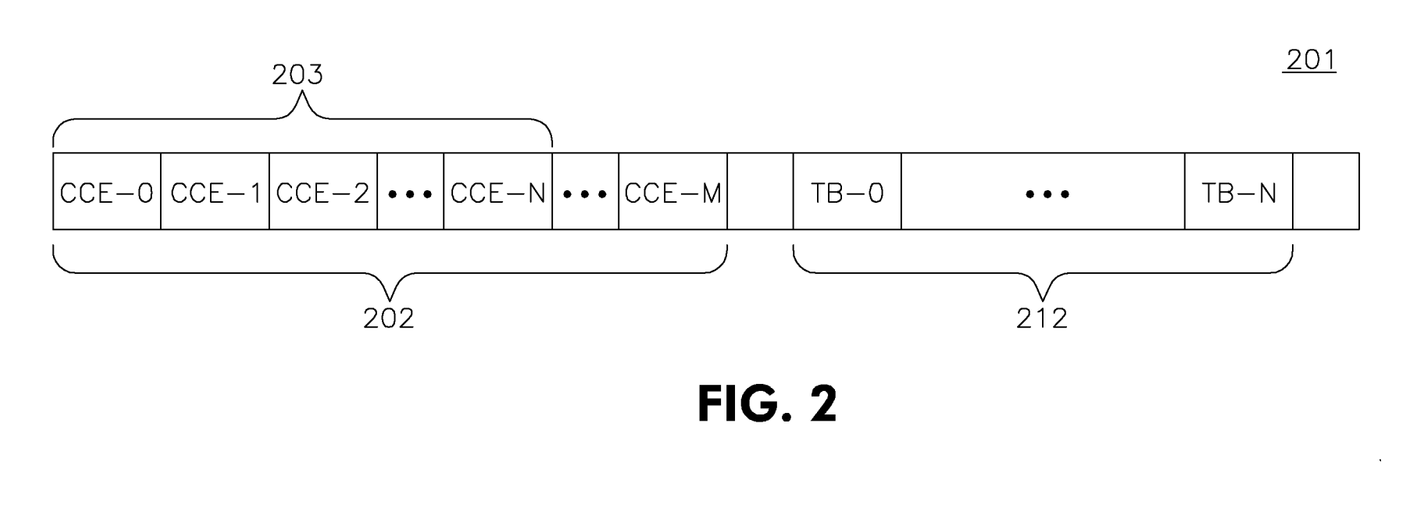
FIG. 2 shows a format for a RACH Response control channel and data channel.

FIG. 2 shows a RACH Response format 201 comprising a control channel 202 and a data channel 212 according to a first embodiment. By way of example, the control channel 202 may be a physical downlink control channel (PDCCH) and the data channel 212 may be a physical downlink shared channel (PDSCH). The control channel 202 includes a common control portion 203, in which a plurality of control channel elements (CCEs), CCE-0 to CCE-N, are defined for RACH Responses intended for WTRUs 102-104. Each set of CCEs contains location information for directing each respective WTRU to the RACH Response resource allocation found on the data channel 212 in transport blocks TB-0 to TB-N.

The CCEs may also include transport format information, such as the transport formats and modulation and coding scheme (MCS) to be used for decoding the RACH Response message on the data channel 212.

In the first embodiment, the WTRUs 102-104 perform blind decoding of the common control elements CCE-0 to CCE-N within the common control portion 203, searching for their respective CCE having the intended RACH Response control information. The starting location of the common control signal portion 203 may be pre-defined. For example, the starting location may be set to CCE-0, as shown in FIG. 2. The required RACH Response resources (i.e., the number of common control elements) may vary based on the number of WTRUs requiring the random access responses. A maximum number of CCEs may be specified accordingly.

Figure 3:
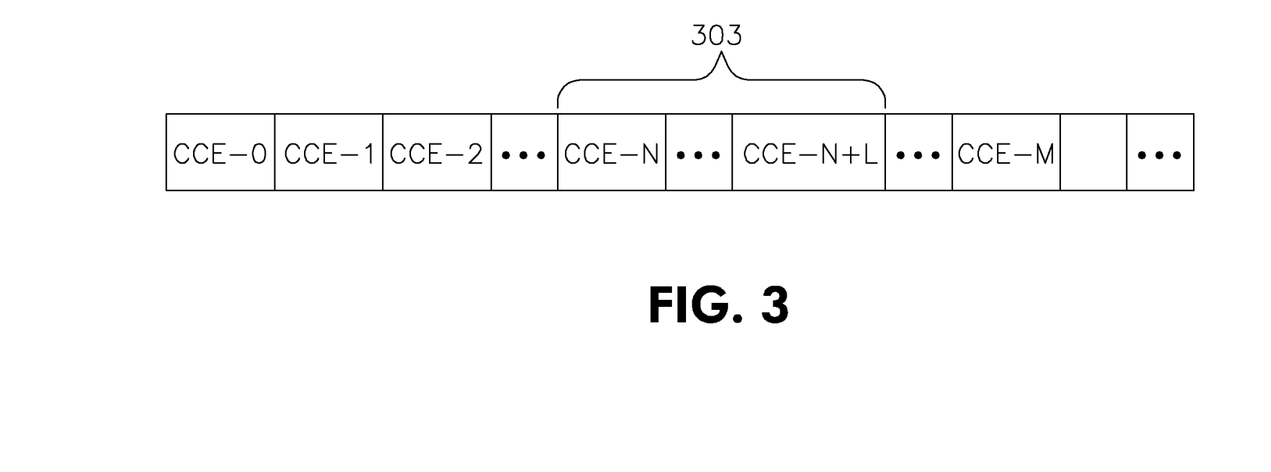
FIG. 3 shows an alternative format for a RACH Response control channel.

FIG. 3 shows an alternative embodiment to the starting point being defined as CCE-0, where a subset L of CCEs between CCE-N and CCE-M may be allocated for a RACH Response common control portion 303. For example, CCE-N to CCE-N+L may be allocated for the common control portion 303, as shown in FIG. 3. Alternatively, the common control portion 303 may be allocated to CCE-M−L to CCE-M, or any other subset of CCEs.

The starting location of the RACH Response common control portion 303, the number of CCEs, and/or the subset of L CCEs may be received by the WTRUs 102-104 in one of the broadcast channel (BCH) system information blocks (SIBs).

Figure 4:
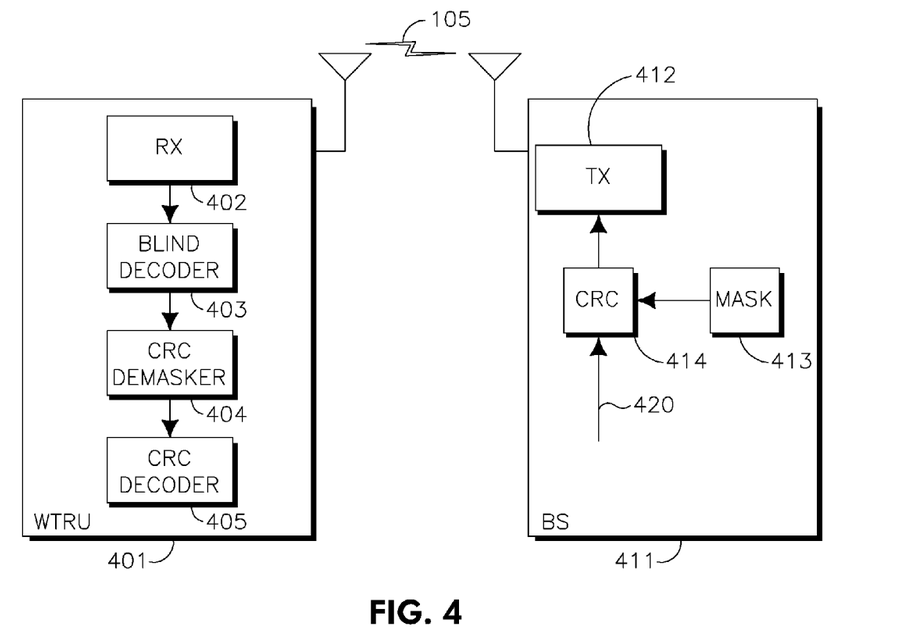
FIG. 4 shows a WTRU configuration for receiving a RACH Response.

FIG. 4 shows a WTRU 401 configured to receive and process the RACH Response 105 from a base station 411. At the base station 411, a cyclic redundancy code (CRC) generator 414 computes a CRC which is added as a set of bits onto CCE control information 420. The CRC is first is masked by an ID code at mask encoder 413. The masked CRC is then added to the CCE information 420. As an example, a 16-bit CRC code may be masked by a 16-bit ID, and then encoded onto the control information 420 for transmission at transmitter 412.

At WTRU 401, receiver 402 demodulates the received RF RACH Response signal 105, and blind decoder 403 processes the demodulated received signal 105, for example, by using a forward error correction (FEC) code or a Viterbi code. A CRC de-masker 404 processes the CRC bits by de-masking them according to the ID code. Next, a CRC decoder 405 decodes the de-masked CRC bits, allowing the WTRU 401 to perform an error check on the received CCEs of the RACH Response. The blind decoder 403, CRC de-masker 404, and CRC decoder 405 may be implemented as a single processor or as separate individual processors.

The ID code may be a Group ID or a WTRU-specific ID. The Group ID is used when a set of WTRUs served by the base station 411 are to receive a common RACH Response. The ID code may be a temporary ID assigned to a WTRU to identify the RACH Response addressed to it even if sharing a Group ID with other WTRUs. For example, the temporary ID may be a RACH radio network temporary ID (RA-RNTI). The ID code is received by the WTRU 401 with other system parameters when it initially acquires a cell and camps on the cell of the base station 411 via higher layer signaling.

Alternatively, a fixed time-frequency resource allocation may be dedicated to the CCEs corresponding to the random access grant control in the RACH Response. This fixed resource allocation may be independent of the other physical channel allocations, such as a physical HARQ indicator channel (PHICH) location, and avoids the need to have any knowledge of the configuration of those other physical channels. For example, the fixed time-frequency resource allocation dedicated to the RACH Response control may be allocated at a location immediately following a particular type of physical channel, such as a physical control format indicator channel (PCFICH).

For better performance and scheduling flexibility, the CCEs may be spread in time-frequency domain, within the control portion of a sub-frame. A one-to-one association (e.g., a time offset) between the random access request in the RACH preamble and a dedicated time-frequency resource allocation may be used to provide WTRU-specific RACH Response control.

In a second embodiment, multiple RACH Responses are sent to each of several different WTRUs. In a first alternative, each RACH Response control portion only contains resource allocation and transport format information for one WTRU RACH Response data portion. In another alternative, each RACH Response combines both control and data portions together for one WTRU. The RA-RNTI may be used to scramble each RACH Response control portion or the combined RACH Response control and data. Optionally, the RA-RNTI may be used to scramble the RACH Response data portion since a WTRU knows that the RACH Response data portion part is intended for it based on the RACH Response control portion.

Different antenna configurations may be applied to different RACH responses based on different WTRUs' capabilities. For example multiple-input multiple-output (MIMO) or space frequency block coding (SFBC) may be applied based on the WTRUs' capabilities.

For both alternatives, the first RACH Response data portion or RACH Response control portion may contain the information of how many total RACH Response data portions or RACH Response control portions are to be sent for different WTRUs. From this, the WTRUs know how many RACH Responses they need to detect to find the specific RACH Response intended to them. In doing this, the WTRUs associated with one RA-RNTI do not need to monitor all RACH Response channels, thus reducing the detection complexity and saving power.

If frequency hopping is employed for the RACH Response, the frequency hopping pattern for transmission of the RACH Response control or data portions may be indicated in the first RACH Response control portion or the combined RACH Response data and control. The transport format (such as MCS or power for different WTRUs) may vary for RACH Response data portion which is signaled in the RACH Response control portion. When combining the RACH Response control and data parts together, there is no need to signal the resource allocation for the RACH Response data portion.

The location of the RACH Response per WTRU may be fixed or spread across the time-frequency spectrum. It may be standardized or signaled in one of the BCH SIBs.

For the first and the second embodiments for the RACH Response, the network may decide which format should be used for the RACH Response. The exact RACH Response to be used may be signaled in the BCH so that the WTRU knows how to perform the blind decoding. For example, the WTRU may receive a downlink control indicator (DCI) format code, detected by the blind decoder 403, from which the WTRU may know the size (e.g., number of CCEs) of the RACH Response control portion and/or the starting location of the RACH Response control on the sub-frame.

Different RACH Response locations for different WTRUs may be associated with WTRU IDs (e.g., cell radio network temporary identity (C-RNTI), international mobile subscriber identity (IMSI), international mobile equipment identity (IMEI), or any other WTRU ID). The WTRU IDs may be known from the paging information. The relation between the WTRU ID and its RACH location may be pre-defined. In this way, the WTRU knows where to look for its RACH channel.

As an alternative, the initial RACH response location for the WTRU may be signaled in the BCH or derived from a relation between the WTRU ID and RACH location and then the WTRU may get the location of subsequent RACHs in the first RACH Response message signaled, (e.g., in case that the WTRU fails at the first RACH and has to send another RACH).

It should be noted that although the embodiments are described with reference to LTE, this is an example implementation, and the embodiments may be applied to any other wireless communication systems, such as high speed packet access (HSPA) systems or future development, and other wireless system when similar services and concepts are supported.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) comprising:
   a transmitter configured to transmit a random access preamble;
   a receiver configured to receive a downlink transmission, wherein the downlink transmission comprises a physical downlink control channel (PDCCH), the PDCCH comprises a plurality of control channel elements (CCEs), and a subset of the plurality of CCEs corresponds to a common portion of the PDCCH, wherein the common portion of the PDCCH is intended for a plurality of WTRUs and is not addressed to a WTRU-specific identity for the WTRU; and
   a processor, operatively coupled to the transmitter and the receiver, configured to:
      perform decoding within the subset of the plurality of CCEs to detect downlink control information intended for the WTRU, wherein the downlink control information comprises a resource allocation to be used to process a random access channel (RACH) response in a physical downlink shared channel (PDSCH) included in the downlink transmission; and
      process the RACH response in the PDSCH in accordance with the downlink control information.

2. The WTRU of claim 1, wherein the processor is configured to perform the decoding to the subset of the plurality of CCEs corresponding to the common portion of the PDCCH.

3. The WTRU of claim 1, wherein the subset of the plurality of CCEs comprises transport format information.

4. The WTRU of claim 1, wherein the processor is configured to decode the RACH response using information relating to a modulation and coding scheme (MCS) included in the subset of the plurality of CCEs.

5. The WTRU of claim 1, wherein the subset of the plurality of CCEs is spread in a time-frequency domain.

6. The WTRU of claim 1, wherein the processor is configured to determine a random access radio network temporary identifier (RA-RNTI), and to unmask a masked cyclic redundancy check (CRC) using the determined RA-RNTI.

7. The WTRU of claim 6, wherein the RA-RNTI is utilized by the plurality of WTRUs.

8. A method performed by a wireless transmit/receive unit (WTRU), the method comprising:
   transmitting a random access preamble;
   receiving a downlink transmission, wherein the downlink transmission comprises a physical downlink control channel (PDCCH), the PDCCH comprises a plurality of control channel elements (CCEs), and a subset of the plurality of CCEs corresponds to a common portion of the PDCCH, wherein the common portion of the PDCCH is intended for a plurality of WTRUs and is not addressed to a WTRU-specific identity for the WTRU;
   performing decoding within the subset of the plurality of CCEs to detect downlink control information intended for the WTRU, wherein the downlink control information comprises a resource allocation to be used to process a random access channel (RACH) response in a physical downlink shared channel (PDSCH) included in the downlink transmission; and
   processing the RACH response in the PDSCH in accordance with the downlink control information.

9. The method of claim 8, wherein the performing of decoding comprises performing decoding to the subset of the plurality of CCEs corresponding to the common portion of the PDCCH.

10. The method of claim 8, wherein the subset of the plurality of CCEs comprises transport format information.

11. The method of claim 8, wherein the processing of the RACH response comprises decoding the RACH response using information relating to a modulation and coding scheme (MCS) included in the subset of the plurality of CCEs.

12. The method of claim 8, wherein the subset of the plurality of CCEs is spread in a time-frequency domain.

13. The method of claim 8, further comprising determining a random access radio network temporary identifier (RA-RNTI), and unmasking a masked cyclic redundancy check (CRC) using the determined RA-RNTI.

14. The method of claim 13, wherein the RA-RNTI is utilized by the plurality of WTRUs.

15. The method of claim 8, wherein a starting CCE of the subset of the plurality of CCEs of the PDCCH corresponds to a first CCE in the PDCCH.

16. The method of claim 8, wherein the subset of the plurality of CCEs of the PDCCH corresponds to a number of consecutive CCEs in the PDCCH.

17. The method of claim 8, wherein the subset of the plurality of CCEs of the PDCCH comprises downlink control information that comprises a RACH response intended for at least one other WTRU.

18. The WTRU of claim 1, wherein a starting CCE of the subset of the plurality of CCEs of the PDCCH corresponds to a first CCE in the PDCCH.

19. The WTRU of claim 1, wherein the subset of the plurality of CCEs of the PDCCH corresponds to a number of consecutive CCEs in the PDCCH.

20. The WTRU of claim 1, wherein the subset of the plurality of CCEs of the PDCCH comprises downlink control information that comprises a RACH response intended for at least one other WTRU.

\* \* \* \* \*

UNITED STATES PATENT AND TRADEMARK OFFICE
CERTIFICATE OF CORRECTION

PATENT NO. : 9,730,244 B2
APPLICATION NO. : 14/966275
DATED : August 8, 2017
INVENTOR(S) : Kalpendu R. Pasad, Shankar Somasundaram and Jin Wang Page 1 of 1

It is certified that error appears in the above-identified patent and that said Letters Patent is hereby corrected as shown below:

On the Title Page

Under OTHER PUBLICATIONS, Column 2, Line 3, after "Nokia," change "Nokis-Siemens Networks" to --Nokia Siemens Networks--.

In the Specification

Column 1, Line 9, change "Nov. 11, 2003" to --Nov. 11, 2013--.

Signed and Sealed this
Twenty-ninth Day of October, 2019

Andrei Iancu
*Director of the United States Patent and Trademark Office*